25890

Nov. 27, 1962     C. R. ELIAS     3,065,655
ADJUSTABLE BORING TOOL

Filed July 10, 1959     2 Sheets-Sheet 1

INVENTOR.
CHARLES ROBERT ELIAS
BY
ATTORNEY

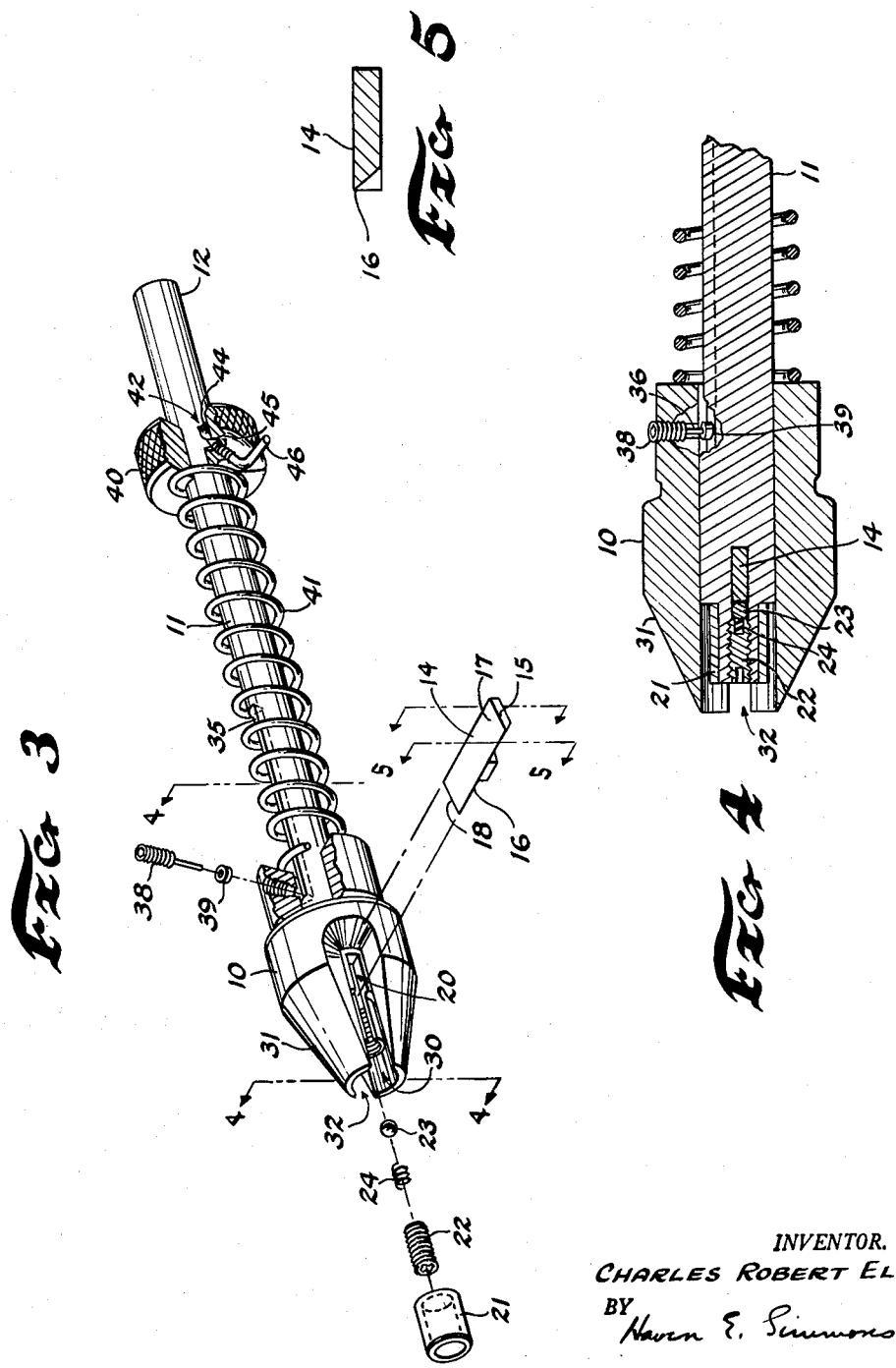

3,065,655
ADJUSTABLE BORING TOOL
Charles Robert Elias, 1990 10th Ave., Marion, Iowa
Filed July 10, 1959, Ser. No. 826,198
4 Claims. (Cl. 77—58)

The present invention relates to boring tools, particularly to tools to bore out an existing hole accurately and concentrically.

Cutting large holes accurately in machineable materials with relatively modest equipment, such as a drill press, with standard drill sizes, reamers, counterbores, fly cutters and so forth, becomes more and more difficult as the size of the holes increases. Each size of hole usually requires at least one specific tool for that particular size and the cutting process is further dependent upon the power available to drive the cutter, its spindle speed, the toughness or fragility of the material and the precision demanded of the diameter, location and finish of the hole. The cost and even in many cases the inadequacy of existing tools, force the use of boring machines instead of the simpler and more available drill press for all but the most routine and standard size holes. The art is much in need of a simple, rugged and relatively inexpensive tool which will permit a drill press, for example, to cut a wide variety of large holes accurately in materials of widely diverse character.

Accordingly, the primary object of the present invention is to provide a simple boring tool for the accurate boring out of holes in a wide variety of materials and usable in a drill press or other machine.

Another object of the present invention is the provision of a boring tool employing a boring bar which in turn drives a pilot slidable thereon and resiliently urged against the hole to be bored.

A further object of the present invention is to provide such a boring tool with means for rapid adjustment of the cutting tool to cut holes of different diameters.

An additional object is the provision of such a boring tool with means for rapid adjustment of the bias of the pilot upon the hole.

The present invention is essentially a combination on the one hand of a boring bar with a transversely adjustable cutting tool and on the other hand of a spring biased pilot bored axially to fit slidably upon the boring bar and keyed to the latter by a ball or roller to permit both rotation of the pilot by the bar and axial movement of the two relative to each other. The pilot is biased relative to the bar so that it is urged firmly against the periphery of the hole being bored out in order to maintain concentricity of the new hole at all times no matter in what position the boring bar and cutting tool may be relative to the pilot. The operative surface of the pilot is essentially conical in form and the included angle at its apex is such as to permit the pilot to project into the hole a sufficient distance, depending upon the nature of the material being bored, in order to provide the best possible guidance for the boring bar. The spring biasing may be made adjustable to accommodate the nature of the material being bored and to provide pressure necessary upon the pilot to keep it firmly seated and chatter at a minimum. The tool is thus adaptable to a large range of materials: woods, plastics, metals, even sheet metal.

Other and further objects, features and advantages will be apparent from the description of the preferred form of the invention which follows, read in conjunction with the accompanying drawing, in which:

FIGURE 3 is a perspective view of the tool alone with various portions shown in exploded and cut-away form;

FIGURE 4 is a sectional view taken between the lines 4—4 of FIGURE 3; and

FIGURE 5 is a sectional view taken along line 5—5 of FIGURE 3.

Figure 1:
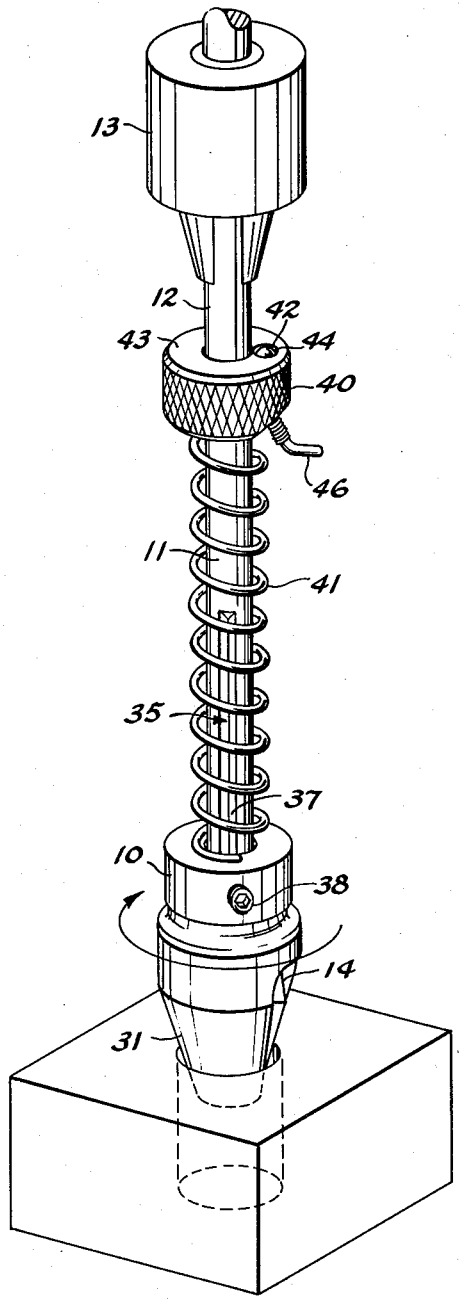
FIGURE 1 is a perspective view of the tool at the start of its boring operation.

In order to facilitate understanding of the invention, reference is made to the embodiments thereof shown in the accompanying drawings and detailed descriptive language is employed. It will, nevertheless, be understood that no limitation of the invention is thereby intended and that various changes and alterations are contemplated such as would ordinarily occur to one skilled in the art to which the invention relates.

Referring now to the drawings, the basic components of the tool are pilot head 10 and boring bar 11, the latter of cylindrical shape with its upper end 12 adapted to fit a chuck 13 or other similar driving device and made of suitable steel. At its lower end is secured cutting tool or bit 14 extending radially therefrom. Bit 14 may be round in cross section but is preferably rectangular for ease of sharpening and rigidity of mounting and may be made of any suitable tool steel. In cross section, bit 14 should be about twice as deep as it is wide (see FIGURE 5) and its cutting face should have a proper rake 15. In addition, the lower face of bit 14 is relieved to provide a leading cutting edge 16 (see FIGURE 5). The cutting end 17 should be relieved slightly in an upwardly direction (see FIGURES 1 and 2) while the other end 18 may be ground to an appropriate angle or form for chamfering or shaping the edge of the hole after boring.

Since broaching a rectangular mounting slot through bar 11 to secure bit 14 is expensive and difficult, instead, the lower end of bar 11 is bifurcated along the axis thereof by slot 20 of uniform width for a distance in excess of the depth of bit 14. The bottom surface of slot 20 should be shaped to bear uniformly upon the top surface of bit 14 and the width thereof should be just enough to permit insertion and removal of various bits. The remainder of the bifurcated portion of bar 11 below bit 14 is necked down to take a sleeve 21, whose diameter is less than that of bar 11, pressed or threaded thereon in order to provide support for the walls of slot 20. The sleeved portion of the bifurcated ends of bar 11 is drilled axially through to the bit encompassing portion and is threaded to take a suitable set screw 22. Between the latter and bit 14 is interposed a ball 23, of material softer than bit 14, and set screw 22 and ball 23 are urged apart by helical compressible spring 24. The latter is of such diameter as to permit it to be recessed in the inner end of set screw 22 and of such length as to permit the periphery of the recess in set screw 22, when turned in, to bear directly against ball 23 without interference with spring 24.

Pilot head 10 is generally cylindrical in shape and made from suitable hardenable tool steel. Pilot head 10 has a cylindrical bore 30 therethrough of such size as to make just a sliding fit with bar 11. The lower end of pilot head 10 is provided with a conical pilot surface 31 tapering down at its lower end to bore 30. An opening or slot 32 of uniform width bifurcates the whole of surface 31 along the axis of bore 30. The width of slot 32 must be somewhat greater than that of bit 14 so that the latter moves easily therein without touching the walls of slot 32 when pilot 10 and bar 11 are moved axially relative to each other. The leading portion of pilot surface 31 adjacent the opening of slot 32 through which the cutting end 17 of bit 14 projects is relieved to allow automatic removal of chips and shavings. The relief is carried through to slot 32 and begins at the lower end of the latter, increasing very gradually upwards enough to prevent the chips from jamming therein. It is most important that this relief be just the minimum necessary to prevent clogging so that pilot surface 31 is not destroyed or impaired any further than is absolute necessary. At the top of slot 32 the relief may be increased sharply up into the body of pilot head 10 above pilot surface 31 in order to permit the chips to exit of their own accord from slot 32 (see FIGURES 1, 2 and 3). All edges formed by the intersection of pilot surface 31 and slot 32 are slightly radiused to prevent them cutting or gouging the work.

Pilot head 10 is keyed to bar 11 to permit it to be driven by the latter and at the same time to be slidable thereon. Any suitable method may be used. The one shown utilizes a V-shaped channel 35 on bar 11 parallel to its axis but off-set from alignment with slot 32 so that chips do not collect therein when, by axial movement of bar 11, a portion of channel 35 is level with slot 32. The angle between the walls of the V is slightly obtuse. A passage 36 is drilled in the upper end of pilot head 10 opening into channel 35. The wall of passage 36 is both parallel to driving surface 37 of channel 35, surface 37 being adjacent the leading edge (with reference to operative rotation of bar 11) formed by the latter and channel 35, and off-set slightly in a trailing direction from surface 37, the center line of passage 36 being at the same time perpendicular to a plane through the axis of bar 11. A pin 38 is threaded into or otherwise secured in passage 36 and provided on its inner end with roller 39 of such diameter that its rolling surface engages and rolls upon driving surface 37 of channel 35. The relative locations of channel 35 and roller 39 must be such that bit 14 does not bind in or touch the walls of slot 32 during rotation of pilot head 10 by bar 11 and axial movement of the latter two relative to each other.

The included angle between the sides of pilot surface 31 is not particularly critical but should, however, be less than 90°. Generally, the tougher the material being bored, the more acute the angle should be so that the reaction of the bit tending to push the entire tool off center and out of the work is better resisted. It has been found that an angle of about 70° is very suitable for all kinds of wood, 50° to 60° for the softer metals and about 40° to 45° for steel.

Pilot head 10 is slidably biased on boring bar 11 toward bit 14 by any suitable resilient means. The means shown employ a collar 40 slidable on bar 11 at its upper portion and a compressible helical spring 41 around bar 11 and interposed between the upper end of pilot head 10 and the lower surface of collar 40. The vertical position of collar 40 on bar 11 must be adjustable so that the force exerted by pilot head 10 upon the work can be varied according to that required, owing to the toughness of the work, to keep pilot surface 31 firmly in contact with the latter. For this purpose a self-locking mechanism for collar 40 is desirable. To this end, a passage 42 is drilled from the upper surface 43 of collar 40 downwardly to the bore therethrough at a suitable angle to the axis of bar 11 so that when ball 44 having a free fit in passage 42 is positioned therein, movement of collar 40 toward end 12 of bar 11 causes ball 44 to wedge between passage 42 and the surface of bar 11; an angle of about 15° works very well. Passage 42 must, of course, be of such size relative to collar 40 that the body of the latter is not unduly weakened by passage 42. Ball 44 is made captive in passage 42 by any means, such as staking the upper edge of the latter on surface 43 of collar 40. The latter then will slide easily downwardly on bar 11 but the slightest motion thereon in the opposite direction will wedge ball 44 between the wall of passage 42 and the surface of bar 11. In order to provide for the release of collar 40 for movement in an upward direction, a passage 45 is drilled in collar 40 intersecting passage 42 at a point between ball 44 and bar 11 and at an angle so that the inner end of a thumb screw 46 or similar means threaded into passage 45 will contact ball 44 and move it up passage 42 away from bar 11. A spring may be interposed behind ball 44 to urge it down passage 42 toward bar 11, but generally this is unnecessary.

Figure 2:
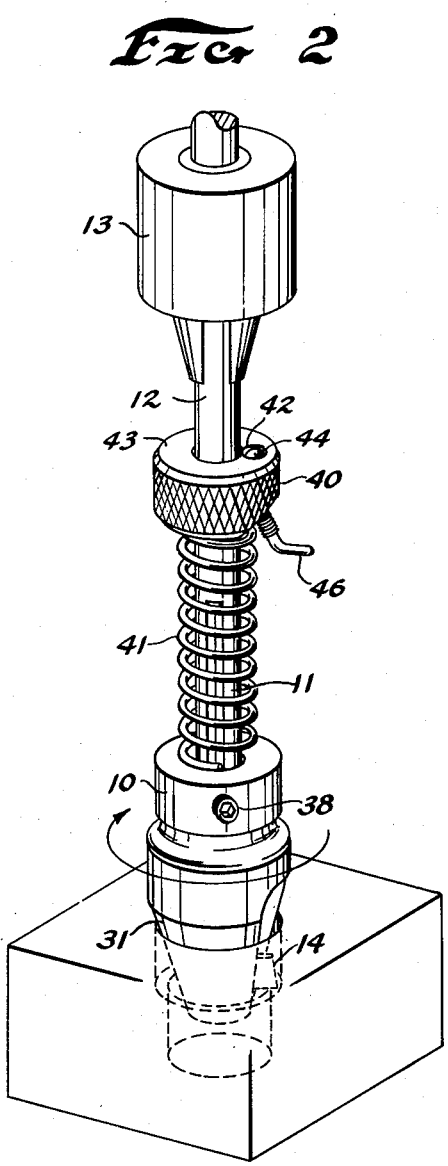
FIGURE 2 is a perspective view of the tool in the midst of its boring operation.

The operation of the tool is more or less obvious from the drawings, particularly FIGURES 1 and 2, and the preceding description. The hole to be bored out must, of course, be of a somewhat greater diameter than bore 30 through pilot head 10 in order that pilot surface 31 thereof may project into and bear upon the periphery of the hole. Correspondingly, the greatest diameter of a hole borable by a given size of pilot head 10 is somewhat less than the greatest diameter of pilot surface 31. The cutting radius of bit 14 is set by backing off set screw 22 so that bit 14 may be adjusted radially by a micrometer arrangement or other suitable instrument, or even by use of a hole of known diameter. When screw 22 is backed off, spring 24 nevertheless holds ball 23 and bit 14 firmly against the top of slot 20. Thus, when the cutting radius of bit 14 has been set and set screw 22 is turned in again to contact ball 23, the position of bit 14 will not be disturbed from its setting. The tool is mounted in chuck 13 and fed downwardly until pilot surface 31 engages the periphery of the hole and centers itself therein. Collar 40 is then adjusted so that spring 41 provides suitable tension upon pilot head 10. As boring bar 11 is rotated by chuck 13 pilot head 10 is also rotated thereby and as boring bar 11 is fed downwardly in pilot head 10, bit 14 also moves downwardly in slot 32. Edge 16 engages the work and, as bar 11 continues to descend, cuts out the full radius of the new hole. At the same time the peripheral edge of the initial hole bearing on pilot surface 31 gradually moves downwardly until pilot surface 31 contacts the peripheral edge of the new hole upon which it thereafter bears throughout the remainder of the descent of bar 11 (compare FIGURES 1 and 2). The boring radius of bit 14 is thus at all times held concentric with the initial hole. When boring material other than wood, etc., the periphery of the hole upon which pilot surface 31 bears should be suitably lubricated. Since the hole to be bored out must be somewhat larger than bore 30 through pilot head 10 and since the largest hole that can be bored is less than the greater diameter of pilot surface 31, it may be desirable, in order to bore a wide range of holes, to have 2 or 3 separate tools with pilot heads and boring bars of different diameters and lengths.

Other operations may also be performed with the tool. For instance, a center drill of any given diameter larger than boring bar 11 may be fitted to the lower end of the latter so that an initial hole can first be drilled and then bored out to the required size by bit 14, all in one operation. Furthermore, after a hole is bored out, bit 14 may be shifted so that end 18 thereof is brought into operation to deburr or countersink or chamfer the edge of the hole, depending upon the shape of end 18. Also edge 16 of bit 14 may be used simply to counterbore a hole, and by varying the shape of edge 16 and/or its inclination to the axis of bar 11, the shape and/or inclination of the seat of the counterbore can be whatever is desired. In addition, overlapping or intersecting holes may be bored with the tool to the extent that there is a sufficient periphery upon which to center pilot head 10. With a supply of pilot heads, boring bars and bits of different lengths and sizes, the simple drill press or other similar driving means becomes capable of boring a wide range of holes and performing many operations thereon, all with great accuracy and fine finish.

I claim:

1. A boring tool for concentrically enlarging cylindrical bore holes comprising a rectilinear boring bar having a forwardly directed leading end and a trailing end and adapted for rotation about its rectilinear axis, a cutting tool fixed to the leading end of said bar and projecting radially from said bar, said tool having a forwardly presented cutting edge extending substantially normally to the said rectilinear axis to its radially outermost extremity, a pilot head having a rectilinear bore completely therethrough slidably receiving said bar, said pilot head being formed with a conical exterior guide surface converging toward its leading end and concentric to said rectilinear axis, the opposite axial ends of said guide surface being located respectively at lesser and greater distances from said rectilinear axis than said radially outermost extremity of the tool, said pilot being secured against rotation on the bar and disposed for sliding movement on the bar from a forwardly projected position wherein a portion of its conical guide surface is disposed in leading relation to said cutting tool to a rearwardly retracted position wherein said pilot head is spaced axially from and in trailing relation to the cutting tool, said pilot head being formed with an axial recess opening forwardly through its leading end and communicating throughout its entire axial extent with said bore to receive said cutting tool in the said projected position of the pilot head, and means on said bar resiliently urging said pilot head toward its projected position.

2. The device of claim 1 wherein said pilot head is slidably secured on said bar by means comprising a V-shaped channel on said bar parallel to said axis thereof, the angle between the walls of said channel being at least a right angle, a passage adjacent the trailing end of said head opening into said bore therethrough and said channel, the direction of said passage being both in a plane normal to the axis of said bore and parallel to that wall of said channel forming with the surface of said bar the leading outer edge of said channel relative to operative rotation of said bar, means secured in said passage having a roller mounted on its inner end and within said channel to engage and roll upon said wall of said channel.

3. The device of claim 1 wherein means are provided to permit adjustment of the radial extension of said cutting tool from said bar comprising a diametrical slot through said bar adjacent the leading end thereof sufficient to permit radial insertion and adjustment of said tool, a passage extending axially from said end of said bar to said tool therein, a ball in said passage and bearable against said tool, releaseable means in said passage to exert pressure upon said ball and tool, and a compressible helical spring in said passage between said ball and said means.

4. The device of claim 1 wherein said means on said bar comprise a collar slidable upon said bar between the trailing end thereof and the trailing end of said head, a compressible helical spring encompassing said bar and partially compressed between said end of said head and said collar, a cylindrical passage in said collar opening into the bore therethrough, a ball of a diameter substantially equal to that of said passage and freely movable therein to contact said bar, the axis of said passage forming an acute angle with the portion of the axis of said bar immediately adjacent the trailing end thereof, said angle being sufficient to cause said ball to wedge between said passage and said bar when said collar is urged toward the trailing end of said bar by said spring, whereby said collar is locked in position upon said bar, and means to optionally move said ball in said passage away from said bar in order to release said collar and permit slidable adjustment thereof along said bar.

References Cited in the file of this patent

UNITED STATES PATENTS

| | | |
|---|---|---|
| 2,187,221 | Brown | Jan. 16, 1940 |
| 2,599,887 | Besse | June 10, 1952 |
| 2,661,639 | Clyde | Dec. 8, 1953 |
| 2,792,726 | Vick | May 21, 1957 |
| 2,804,789 | Randles | Sept. 3, 1957 |